UNITED STATES PATENT OFFICE.

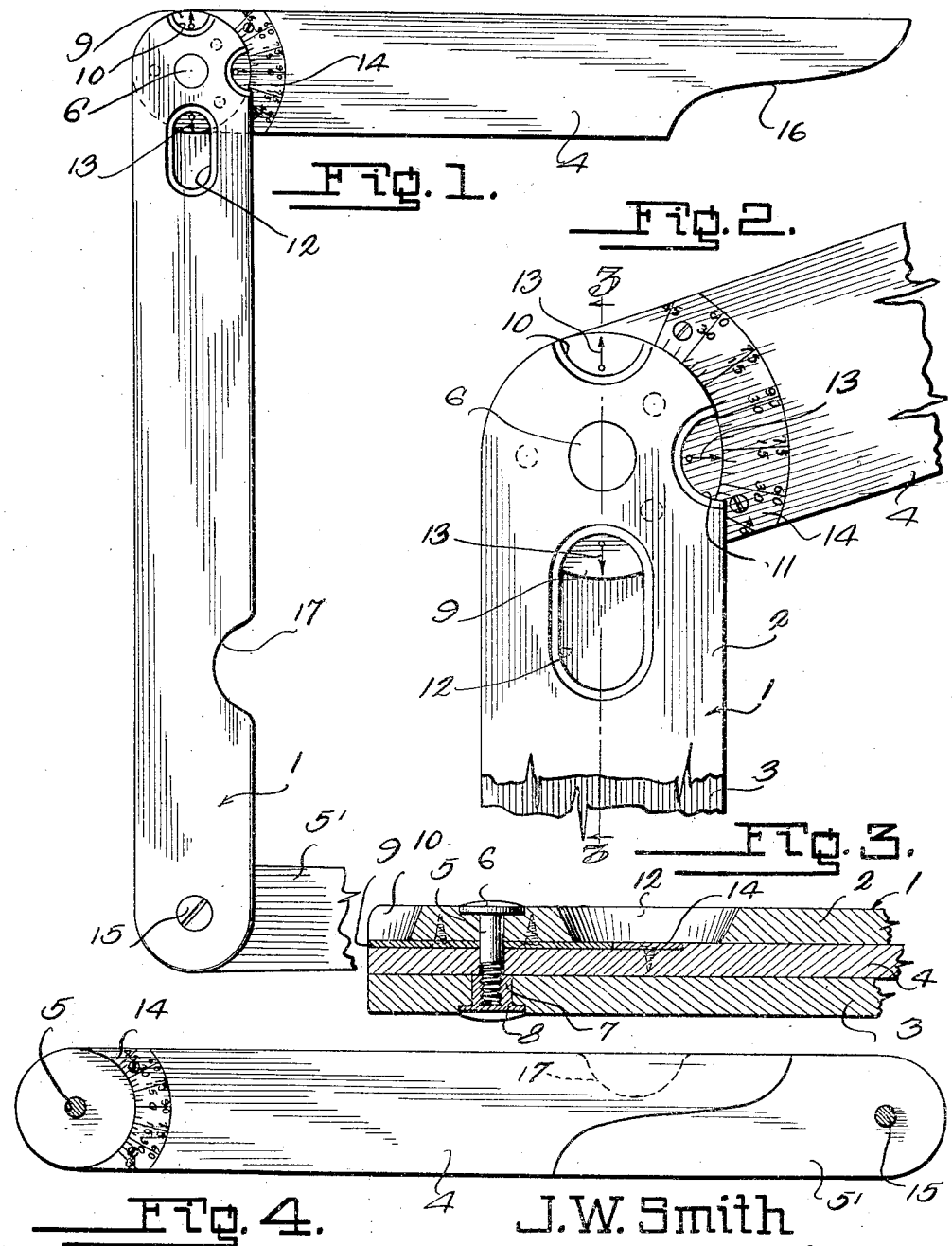

JOHN W. SMITH, OF ST. HELENS, OREGON.

BEVEL.

1,336,102. Specification of Letters Patent. Patented Apr. 6, 1920.

Application filed January 30, 1919. Serial No. 274,090.

*To all whom it may concern:*

Be it known that I, JOHN W. SMITH, a citizen of the United States, residing at St. Helens, in the county of Columbia and State of Oregon, have invented certain new and useful Improvements in Bevels, of which the following is a specification.

This invention relates to bevels, and an object of the invention is to provide a bevel, particularly adapted for use in ship building, to facilitate the determining of the degree of the angled end of various parts of the ship construction.

In ship construction, considerable difficulty is experienced in properly gaging and setting a bevel, to provide the proper angle or degree of bevel to various parts of a ship construction; and it is an object of this invention to provide a bevel, including a pivoted blade, which carries an arcuate scale or protractor, which is actuated to indicate various degrees of angle of the blade with respect to the stock of the bevel, when taken in connection with indicating marks upon the wear plate or disk which is positioned between a pair of facing surfaces of the stock and plate, about the pivotal connection thereof.

Other objects of the invention will appear in the following detailed description, taken in connection with the accompanying drawing, forming a part of this specification and in which drawing:

Figure 1 is a plan view of the improved bevel showing the blade in an open position.

Fig. 2 is an enlarged view of the portion of the blade and stock at their pivotal connection, showing clearly the relation between the blade carried protractor and the stock carried indicator.

Fig. 3 is a section on the line 3—3 of Fig. 2, and

Fig. 4 is a plan view of the bevel showing the blade folded and having one side of the stock removed to show the manner of nesting the pivoted blade within the stock.

Referring more particularly to the drawings, 1 indicates the stock of the bevel, which is composed of plates 2 and 3 between which the blade 4 and butt 5' are positioned when the bevel is in a closed position. The blade 4 is pivotally connected, at one end of the stock 1 by a pin 5 the head 6 of which is countersunk in the plates 2 of the stock 1. The pin 5 is provided with a threaded portion which engages in a threaded nut 7 carried by and extending through the plate 3. The nut 7 has a head 8 upon its outer end which is seated in a countersink in the plate 3 and is also provided with a screw driver receiving slot to permit rotation of the nut. The inner end of the nut 7 engages against the blade 4 and by tightening or loosening the nut, the freedom with which the blade 4 moves upon its pivot may be regulated as desired.

A wear disk 9 is attached to the inner surface of the plate 2 of the stock 1 and engages the blade 4, about the pin 5, the said wear disk being concentric of the axis of the pin. The plate 2 of the stock 1 is provided with a pair of cut out portions 10 and 11 opening out to the edges thereof and substantially angled at 90° to each other, the recess 10 being positioned centrally of the longitudinal axis of the stock. The plate 2 is also provided with an oval shaped opening 12 extending therethrough in alinement with the recess 10 and upon the opposite side of the pivot of the blades 4 from said recess. The cut out portions 10 and 11 and the opening 12 are provided to permit the exhibiting of arrows or other suitable indicia 13 which are engraved in or otherwise suitably marked upon the wear disk 9. The blade 4 is preferably recessed, as shown in Fig. 3 of the drawings, to engage the wear disk 9 and also to receive the segmental protractor 14 which is carried by the blade and the inner edge of which rides about the periphery of the wear disk 9. The segmental protractor 14 is graduated to indicate various angles, and the said graduations are adapted for coaction with any one of the indicators 13 to measure the angle of the blade 4 with respect to stock 1. The inserting movement of the blade 4 between the plates 2 and 3 of the stock is limited by the butt 5' which is pivotally connected to the end of the stock opposite to the end to which the blade 4 is connected, by a pin structure 15, similar with the pin structure 5. The free end of the blade 4 and also the free end of the butt 5' may be concavo-convexly cut as indicated at 16, if it is so desired, to insure snug fitting of these ends when in folded position; also if it is so desired, the butt 5' may be moved outwardly, to extend at substantially right angles to the stock 1 during the use of the bevel to assist in supporting the bevel upon a board, and consequently facilitate the scribing of a line along the edge of the blade 4, relieving the user's hand of the weight of the butt end of the stock.

The plates 2 and 3 of the stock may be provided with cut-out portions indicated at 17 to permit gripping of the blade 4 by the thumb and finger of the operator to open out the blade for use.

By means of the segmental protractor 14, and the indicia 13, the user can readily adjust the blade 4 to any desired angle with respect to the stock 1 for scribing anything to be beveled or cut.

Changes in details may be made without departing from the spirit of this invention.

I claim:

1. In a bevel, the combination, of a stock comprising a pair of plates having their facing surfaces spaced, a blade pivoted at one end of the stock and adapted for seating between said plates, and a butt pivotally connected to the stock at the end opposite to the pivot of the blade and adapted to limit the inserting movement of the blade between the plates of the stock.

2. In a bevel, the combination, of a stock comprising a pair of plates having their facing surfaces spaced, a blade pivoted at one end of the stock and adapted for seating between the plates thereof, a butt pivotally connected to the stock at the end opposite to the pivot of the blade and adapted to limit the inserting movement of the blade between the plates of the stock, said butt adapted for projection from between the plates to engage a flat surface and co-act with the blade in supporting the bevel.

3. In a bevel, the combination, of a stock comprising a pair of plates having their facing surfaces spaced, a blade pivoted at one end of the stock and adapted for seating between the plates thereof, a butt pivotally connected to the stock at the end opposite to the pivot of the blade and adapted to limit the inserting movement of the blade between the plates of the stock, said butt adapted for projection from between the plates to engage the flat surface and co-act with the blade in supporting the bevel, a wear disk carried by one of said plates and positioned about the pivotal connection between the stock and blade, indicating characters upon said wear disk, and an arcuate protractor carried by said blade for coaction with said indicating characters to determine the degree of the angle of the blade with respect to said stock.

4. In a bevel, the combination, of a stock, a blade pivoted at one end of the stock, a wear plate between the engaging surfaces of the blade and stock, a plurality of indicating characters upon said wearing disk, said stock provided with cut-out portions in its ends and at one side adapted to register with said indicating characters, and a segmental protractor carried by said blade for co-action with said indicating indicia.

JOHN W. SMITH.